A. J. HALL.
CONTROL SYSTEM.
APPLICATION FILED SEPT. 15, 1914.
1,246,421.
Patented Nov. 13, 1917.
3 SHEETS—SHEET 1.
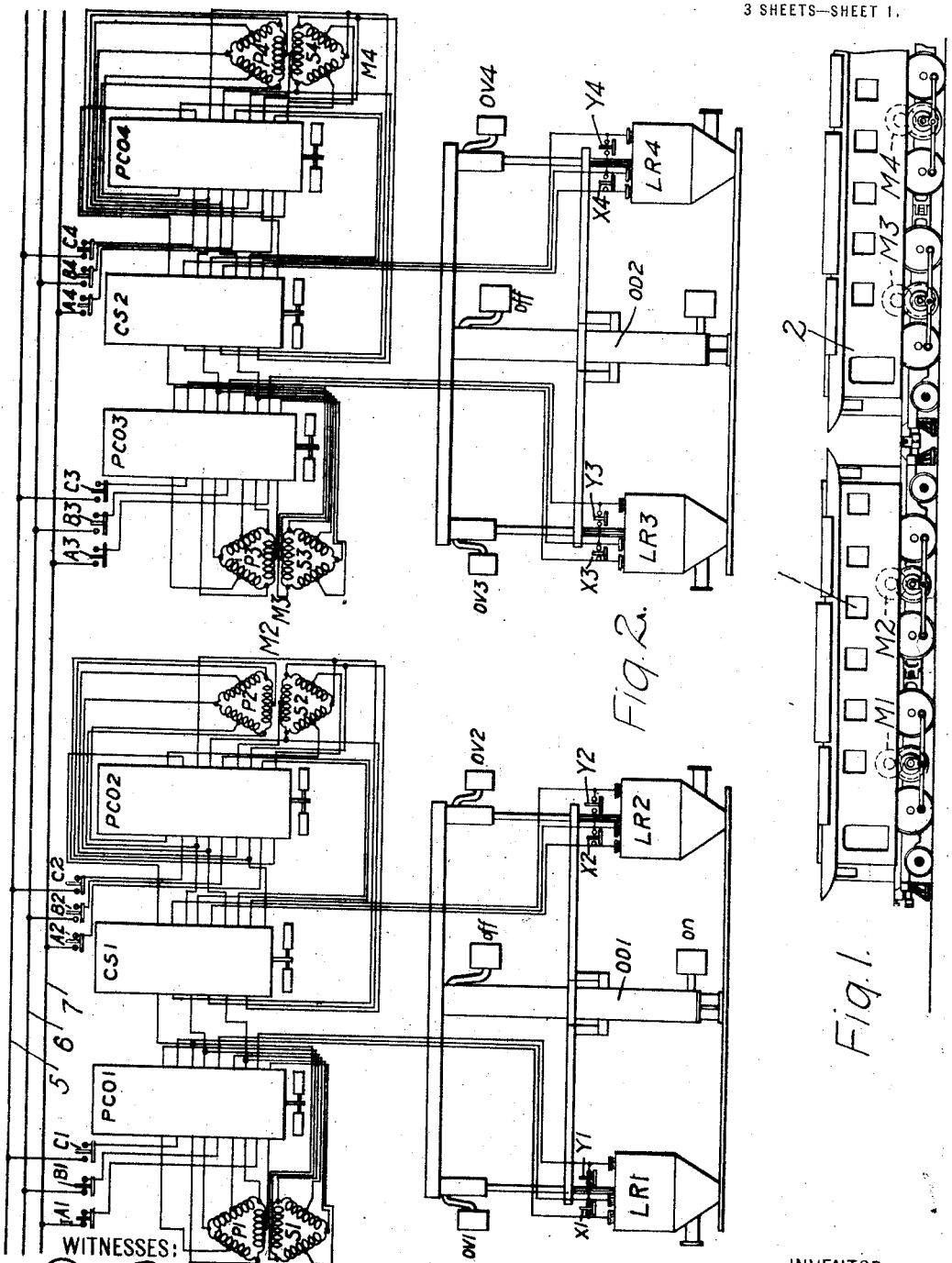
WITNESSES:
INVENTOR
Arthur J. Hall.
BY
ATTORNEY

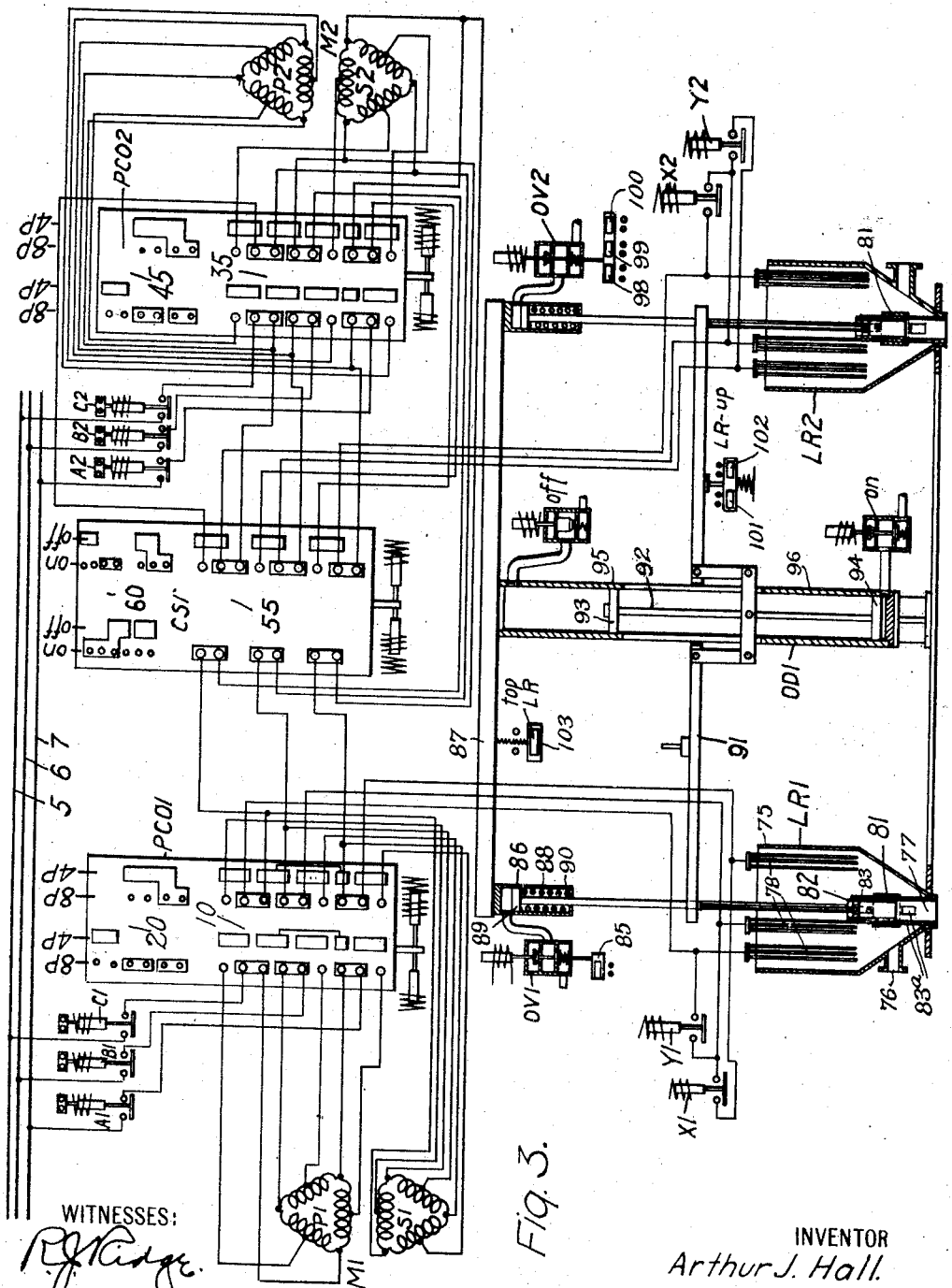

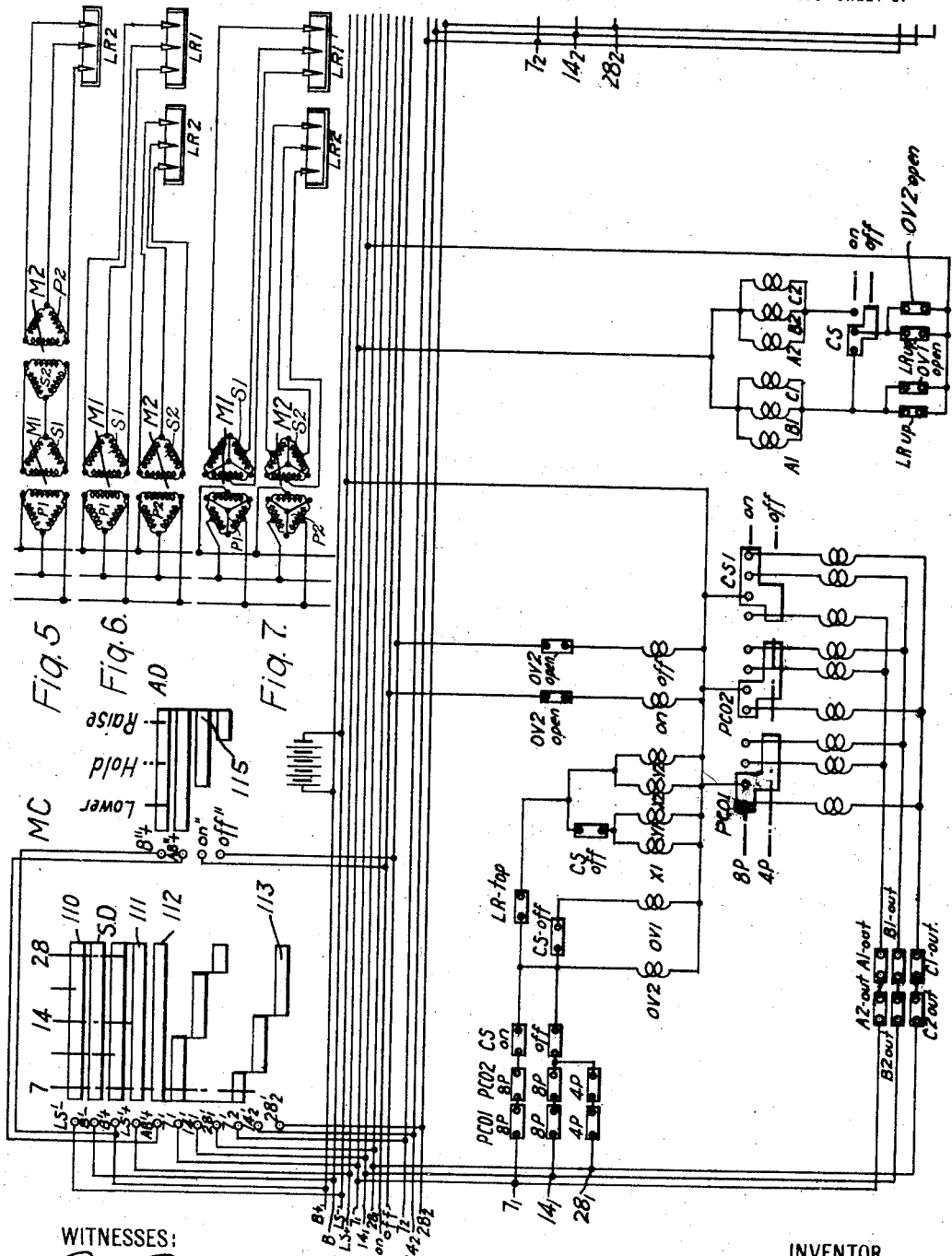

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,246,421.  Specification of Letters Patent.  Patented Nov. 13, 1917.

Application filed September 15, 1914. Serial No. 861,767.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to control systems for dynamo-electric machines, and it has special reference to systems that are adapted to control the operation of electric locomotives or other electrically propelled vehicles.

One of the objects of my invention is to provide a control system of the multiple unit type for governing the operation of the driving motors of an electric locomotive comprising two units that are operated together or of an electric locomotive comprising two motor-driven trucks.

Another object of my invention is to provide a simple system of the above-indicated type embodying means for arranging the motor-circuit connections for different ranges of operating speeds, and also means for effecting successive transitions in the motor-circuit connections of the several half units or driving trucks, whereby a portion of the driving motors act upon the common load during the period of transition.

In my co-pending application, Serial No. 860,607 filed September 8th, 1914, I have shown and described, in detail, a system of control of the general class to which my present invention pertains, except that, in the system referred to, if two half units are employed, the motor-circuit connections are changed over from one speed combination to another concurrently, in which event, the driving effort of all of the motors is discontinued during the transition in motor-circuit connections.

According to my present invention, I propose to provide means associated with the master controller for effecting the transitions separately and successively, while permitting of concurrent governing of the acceleration of the several sets of driving motors.

In order to accomplish the intended results, I provide each locomotive half unit or each driving truck, as the case may be, with identical main and control apparatus and circuit connections which are preferably similar to those set forth in my co-pending application already referred to. Furthermore, I employ a similar master controller and train line conductors, and, in addition thereto, the master controller is provided with an extra conducting segment which is adapted to coöperatively engage additional stationary contact terminals that are connected to corresponding additional train line conductors in such manner that, in moving from one operative position of the master controller to the adjacent position, a successive transition of the motor-circuit connections of the several driving units is effected.

In the accompanying drawings, Figure 1 is a view in side elevation, of an electric locomotive comprising two half units for the control of which my invention is adapted; Fig. 2 is a diagrammatic view of a system of control embodying my invention, the main-circuit connections and apparatus of both locomotive units being shown; Fig. 3 is a diagrammatic view of the complete main-circuit connections and main control apparatus of a portion of my system of control that is adapted to govern the operation of one of the locomotive half units, the auxiliary control apparatus that is actually associated with, and actuated by, certain of the main control apparatus being shown, while the control circuits thereof are omitted for the sake of clearness; and Fig. 4 is a diagrammatic view of a part of the control-circuit connections and control apparatus, including the energizing coils and auxiliary interlocking switches shown in Fig. 3, of my system of control which is adapted to govern the operation of the apparatus shown in Fig. 2.

Only the control apparatus and circuit connections of the first locomotive unit are shown completely, while those for the second locomotive half unit are omitted, on account of their similarity to that portion shown in detail, and are indicated only by three of the auxiliary control circuits which are connected to the train line conductors that are provided exclusively for the control of the second locomotive unit. By so omitting these duplicate control-circuit connections and apparatus, which function in precisely the same manner as the corresponding connections and apparatus for governing the first locomotive half unit, it is believed that a material simplification of the drawings and of the specification results, without detracting in any way from the clearness of disclosure.

Figs. 5, 6 and 7 are diagrammatic views showing the arrangement of motor-circuit connections of the motors of one locomotive half unit for three different speed combinations or ranges of operating speeds.

Inasmuch as the present invention does not pertain directly to the general arrangement of apparatus, circuit connections and mode of operation of the system, a complete description thereof will not be given, particularly since it is clearly and fully set forth in my hereinbefore mentioned co-pending application. I shall, therefore, describe the general operation of the system only at sufficient length to constitute a clear exposition of my invention, and shall pay particular attention to that portion of the system which controls and effects the successive transitions of the several driving units.

Referring to the drawings, the system shown is adapted for the control of a plurality of locomotive half units 1 and 2 that constitute a single locomotive and which are respectively provided with driving motors $M^1$ and $M^2$, and $M^3$ and $M^4$. Obviously, the arrangement of motors with respect to the vehicle is relatively unimportant, and my invention is equally applicable to a single locomotive unit having a plurality of driving motors associated with each of its driving trucks.

The system comprises a plurality of supply circuit conductors 5, 6, and 7 which are adapted to deliver polyphase alternating current energy to the polyphase induction driving motors $M^1$, $M^2$, $M^3$ and $M^4$; a plurality of line switches $A^1$, $B^1$, $C^1$, and $A^2$, $B^2$, $C^2$, and $A^3$, $B^3$, $C^3$ and $A^4$, $B^4$, and $C^4$, for respectively connecting the supply circuit conductors 5, 6 and 7 to the respective motors $M^1$, $M^2$, $M^3$ and $M^4$; pole change-over switches $PCO^1$ and $PCO^2$ for arranging the winding connections of the motors $M^1$ and $M^2$ for different numbers of poles; a cascade switch $CS^1$ for connecting the motors $M^1$ and $M^2$ either in cascade relation or in parallel relation; a plurality of pole change-over switches $PCO^3$ and $PCO^4$ for connecting the windings of motors $M^3$ and $M^4$ for different number of poles; a cascade switch $CS^2$ for arranging the motors $M^3$ and $M^4$ in cascade relation and in parallel circuit relation; a plurality of liquid rheostats $LR^1$, $LR^2$, $LR^3$ and $LR^4$ that are respectively adapted to be connected in the secondary circuits of motors $M^1$, $M^2$, $M^3$ and $M^4$ for governing the acceleration thereof; a plurality of operating devices $OD^1$ and $OD^2$ for respectively actuating the rheostats $LR^1$ and $LR^2$ and the rheostats $LR^3$ and $LR^4$; and a plurality of switches $X^1$, $Y^1$, and $X^2$, $Y^2$, and $X^3$, $Y^3$ and $X^4$ and $Y^4$ for respectively establishing short circuiting connections for the several rheostats $LR^1$, $LR^2$, $LR^3$ and $LR^4$.

The pole change-over switches $PCO^1$ and $PCO^2$, the cascade switch $CS^1$, the liquid rheostats $LR^1$ and $LR^2$ and the operating device $OD^1$, together with their auxiliary apparatus and circuit connections constitute means for governing the operation of the motors $M^1$ and $M^2$ that are associated with locomotive unit 1, while similar devices $PCO^3$, $PCO^4$, $CS^2$, $LR^3$, $LR^4$ and $OD^2$ perform similar functions for the driving motors $M^3$ and $M^4$ of the second locomotive unit 2.

The motors $M^1$, $M^2$, $M^3$ and $M^4$ are preferably of the wound rotor polyphase induction type have primary windings $P^1$, $P^2$, $P^3$ and $P^4$ and secondary windings $S^1$, $S^2$, $S^3$ and $S^4$ respectively. Initially, the windings are connected in delta relation and are adapted for a particular number of poles, for instance, eight poles, while said windings may be reconnected in such manner as to halve the poles and thus produce machines of the four-pole type. No description of the means for adapting the motors for different number of poles will be given, inasmuch as such connections are old and well known in the art.

Particular reference may now be had to Fig. 3, which sets forth the main circuit apparatus and connections for locomotive unit 1. A duplicate set of apparatus and circuit connections is employed for locomotive unit 2 and, therefore, it is deemed necessary to describe only a single set thereof.

The pole change-over switch $PCO^1$ comprises a group 10 of coöperating stationary and movable main contact members and a group 20 of coöperating stationary and movable interlock switch members that are adapted to make coöperative engagement upon the position-indicating lines $8^P$ and $4^P$. The pole change-over switch $PCO^2$ similarly comprises a group 35 of main contact members and a group 45 of interlock switch members that are also adapted for coöperative engagement upon the position-indicating lines $8^P$ and $4^P$. When the pole change-over switches $PCO^1$ and $PCO^2$ occupy their $8^P$ positions, the windings of motors $M^1$ and $M^2$ are arranged for eight poles, while, in the $4^P$ position, the change-over switches adapt the motor windings for four poles. The change-over switches $PCO^1$ and $PCO^2$ are adapted for electromagnetic actuation.

The cascade switch $CS^1$ is similar in construction and operation to the pole change-over switches and comprises a group 55 of coöperating main stationary and movable contact members and a group 60 of coöperating interlock switch members. The cascade switch CS¹ is adapted to occupy two positions "on" and "off," in which its main contact members effect a cascade arrangement of the motors M¹ and M² or connect them in parallel circuit relation. This switch is also electromagnetically actuated.

By proper manipulation of the switches PCO¹, PCO² and CS¹, the motors M¹ and M² may be connected first, in cascade relation, with eight poles, as shown in Fig. 5, second, in parallel relation, with eight poles, as shown in Fig. 6 and third, in parallel relation, with four poles, as shown in Fig. 7, whereby the motors are adapted for three different ranges of operating speeds, for instance, from zero to seven miles per hour, from seven to fourteen miles per hour, and from fourteen to twenty-eight miles per hour.

The liquid rheostat LR¹ comprises a tank 75 having an inlet opening 76 through which electrolyte continuously flows, a discharge opening 77 and a plurality of electrodes 78. Associated with the discharge opening 77 are a plurality of concentrically related valves 81 and 82. The discharge valve 81 surrounds a tubular member 83 which is secured to the inner edges of the discharge opening 77 and is provided with a plurality of openings 83ª near its lower end, and said discharge valve 81 is adapted to be moved downwardly to close said openings 83ª. The valve 82 is the regulating valve and is slidably fitted within the tube 83 and is adapted to be raised or lowered to affect the height of the electrolyte within the rheostat, it being understood that the electrolyte is being continuously admitted into the rheostat and that the excess thereof, when the discharge valve is closed, overflows through said regulating valve 82 and the discharge opening 77. The discharge valve 81 is mechanically associated with a pneumatic operating device 86 which is conveniently supported by a member 87.

The operating device 86 comprises a cylinder 88 containing a movable piston 89 which is normally held in its upper position by a spring 90. An electrically operated outlet valve OV¹ governs the admission of fluid thereto from a suitable source (not shown) and is provided with an interlock switch 85. The valve OV¹, when deënergized, is closed and cuts off the supply of operating fluid while establishing a communication between the cylinder 86 and the atmosphere, whereby its associated discharge valve 81 is held open.

Since the liquid rheostat LR² is similar, in all respects, to the rheostat LR¹, no description thereof will be given. The associated outlet valve OV² is adapted to control the actuation of the discharge valve 81 of rheostat LR², in the same manner as set forth in connection with rheostat LR¹, and is provided with interlock switches 98, 99 and 100.

The regulating valves 82 of rheostats LR¹ and LR² are mechanically associated with the operating devices OD¹ and OD², respectively, being connected to the ends of a common supporting member or arm 91 that is associated with a piston rod 92 having end pistons 93 and 94, which are movable within a plurality of operating cylinders 95 and 96, respectively. The lower end of operating cylinder 96 is provided with an electrically operated valve marked "On" which, when deënergized, establishes communication between the cylinder 96 and the atmosphere and, when energized, admits operating fluid thereto. An electrically operated valve marked "Off" is connected to the upper end of cylinder 95 and, when deënergized, is open to admit operating fluid into said cylinder. Under normal operating conditions, therefore, when both the "on" and "off" magnet valves are deënergized, pressure is released beneath the piston 94 and is admitted above the piston 93, whereby the regulating valves 82 of the several rheostats LR¹ and LR² are biased to, and maintained in, their lowest positions. When both magnet valves are energized, the reverse conditions are obtained, and the regulating valves 82 are moved upwardly. When only the "on" magnet valve is energized, balanced pressures are obtained on the opposite sides of the pistons 93 and 94, and the mechanism is maintained at rest. The operating device OD¹, as a whole, is termed a "balanced-pressure operating device."

Associated with the operating device OD¹, are a plurality of interlock switches 101—LR—up and 102—LR—up to coöperate with the cross arm 91 which operates the regulating valves 82, and said interlock switches are normally opened when the regulating valves 82 and the arm 91 are in their lowest positions and are subsequently closed by suitable means as soon as the cross arm 91 is initially raised. Another auxiliary interlock switch 103—LR—top is associated with the operating device OD¹ and is arranged to be closed only when the cross arm 91 and associated regulating valves 82 are raised to their uppermost or top positions. The interlock switches associated with the outlet valves OV¹ and OV² are opened when their associated valves are deënergized and closed when their respective valves are energized and opened. Hereinafter, the several interlock switches referred to will be designated by their reference numerals together with the valve with which they are associated and the position of the valve in which the switch is closed, as, for instance, interlock switch 100—OV²—open.

Having set forth the arrangement of apparatus and the structural details thereof, I shall now describe, in a general way, the main circuit connections, irrespective of the manner by which and in which said apparatus is actuated and controlled.

Assuming the main circuit connections to be as shown in Fig. 3, the motors $M^1$ and $M^2$ are connected in cascade arrangement, with the secondary windings $S^2$ of motor $M^2$ connected to the secondary windings $S^1$ of motor $M^1$ and the primary windings $P^2$ of motor $M^2$ connected to the rheostat $LR^2$. Moreover, the windings of the several motors are connected for their larger number of poles, namely, eight poles, and hence, this cascade arrangement gives the equivalent of a sixteen-pole machine, so far as the speed of operation is concerned. This constitutes the lowest-speed connection, which, it will be assumed, is adapted to produce a speed of approximately seven miles per hour.

Having established the cascade connections of motors $M^1$ and $M^2$, outlet valve $OV^2$ is energized to effect the closure of the discharge valve 81 of rheostat $LR^2$, under which condition the continuous flow of electrolyte into the rheostat raises the height thereof to the "flush-level", at which height the electrodes 78 are partially immersed and the excess of electrolyte overflows. Subsequent to the action of the outlet valve $OV^2$ and before the "flush-level" is established, the line switches $A^1$, $B^1$ and $C^1$ are closed to connect the supply line conductors 5, 6 and 7 to the primary windings $P^1$ of motor $M^1$. The motor-circuit connections are then as shown in Fig. 5.

The source of energy being thus connected to the motors, said motors are started into operation and may be accelerated by gradually raising the level of the electrolyte within the rheostat $LR^2$, whereby the resistance in the secondary windings $S^2$ of motor $M^2$ is gradually excluded. The elevation of the electrolyte is, of course, effected by raising the regulating valve 82 through the balanced-pressure operating device $OD^1$, it being understood that said device is caused to actuate said valve by energizing the "off" and the "on" magnet valves, whereby operating fluid is admitted beneath piston 94 and released above piston 93. The movement of the valve 82, and hence, motor acceleration, may be arrested by deenergizing the "off" valve, whereby balanced pressures, acting upon the pistons 93 and 94, are obtained.

Having raised the electrolyte to its maximum height, all the resistance is excluded from the secondary circuit of motor $M^2$, and the short-circuiting switches $X^2$ and $Y^2$ are closed. The full-speed operation for this particular connection of motors is thus obtained, namely, seven miles per hour, and this is the first running position of the motors.

In order to increase the motor speed, the valve $OV^2$ is deënergized to permit the opening of the discharge valve 81 of the rheostat $LR^2$. The "off" and "on" magnet valves are also deënergized to permit the balanced-pressure operating device $OD^1$ and its associated regulating valves to be lowered to their initial positions, whereby the liquid rheostat $LR^2$ serves to interrupt the motor circuit, after which line switches $A^1$, $B^1$ and $C^1$ are opened.

Maintaining the pole change-over switches $PCO^1$ and $PCO^2$ in the same positions, the cascade switch $CS^1$ is moved to its "off" position, whereby the motors $M^1$ and $M^2$ are connected in parallel and arranged for their larger number of poles, namely, eight poles. The outlet valves $OV^1$ and $OV^2$ are then energized to effect the closure of the discharge valves 81 of the rheostats $LR^1$ and $LR^2$, whereby the "flush levels" of the electrolyte are established. Prior thereto, however, line switches $A^1$, $B^1$ and $C^1$ and $A^2$, $B^2$ and $C^2$ are closed. Thus, energy is supplied to the motors $M^1$ and $M^2$, which are connected in parallel and independently to rheostats $LR^1$ and $LR^2$, the motor circuit connections being as shown in Fig. 6.

To increase the motor speed, the operating device $OD^1$ is actuated to raise the regulating valves 82, whereby the electrolyte level is increased and the motor secondary resistances correspondingly decreased until the maximum height of the electrolyte is reached, when the short-circuiting switches $X^1$, $Y^1$ and $X^2$ and $Y^2$ are closed. The motors $M^1$ and $M^2$ are then connected in multiple to the supply circuit, with their larger number of poles, namely, eight poles. This is the second running position of the motors, and the speed thereof is substantially double that of the first arrangement of motor-circuit connections, namely, fourteen miles per hour.

A still further range of operating speeds may be obtained by again emptying the rheostats $LR^1$ and $LR^2$ of electrolyte and subsequently opening the several line switches, as hereinbefore described, after which the pole change-over switches $PCO^1$ and $PCO^2$ are moved into their four-pole positions $4^P$, whereby the windings of motors $M^1$ and $M^2$ are re-arranged to halve the number of poles, thus producing four-pole machines. The cascade switch $CS^1$ remains in its "off" position, whereby the multiple arrangement of the motors $M^1$ and $M^2$ is maintained.

Subsequent to arranging the motors for multiple operation and four-pole windings, the outlet valves $OV^1$ and $OV^2$ and the line switches $A^1$, $B^1$, $C^1$ and $A^2$, $B^2$ and $C^2$ are actuated in the manner already set forth. The motor connections are then as shown in Fig. 7. Energy is thus supplied to the motors $M^1$ and $M^2$, and they may be brought up to speed by raising the level of the electrolyte within the rheostats $LR^1$ and $LR^2$ until the maximum heights are reached, when the short-circuit switches $X^1$, $Y^1$ and $X^2$ and $Y^2$ are closed. Under these conditions, the motors $M^1$ and $M^2$ are connected in multiple arrangement with four poles, each with all their secondary resistance excluded. This is the third or full running-speed condition and is adapted to effect a speed of twenty-eight miles per hour.

It will be seen, therefore, that the motors may be arranged for three ranges of operating speeds; first, from zero to seven miles an hour, with eight-pole windings and cascade arrangement; second, from seven to fourteen miles an hour, with eight-pole windings and multiple arrangement; and third, from fourteen to twenty-eight miles an hour, with four-pole windings and multiple arrangement.

Reference may now be had to Fig. 4, in which the auxiliary control apparatus and circuit connections are shown for effecting the multiple unit operation of the two locomotive half units 1 and 2.

Among the apparatus shown, is a master controller MC comprising two parts, a speed drum SD and an acceleration drum AD. The speed drum SD comprises a plurality of stationary contact terminals $LS'-$, $B'-$, $B'+$, $LS'+$, $AB'+$, $7'_1$, $14'_1$, $28'_1$, $7'_2$, $14'_2$ and $28'_2$ which are adapted to coöperatively engage a plurality of movable conducting segments 110, 111, 112 and 113 upon the position-indicating lines 7, 14 and 28 which represent the operative positions of the speed drum SD in which the connections of the motors of the several locomotive half units 1 and 2 are arranged for different speed combinations or ranges of operating speeds. The acceleration drum AD comprises stationary contact terminals $B''+$, $AB''+$, "on" and "off" which coöperate with a movable conducting segment 115 and effect engagement therewith upon the position-indicating lines marked "Lower", "Hold" and "Raise".

In order to provide for multiple unit train operation, a plurality of train line conductors are employed, namely, $B+$, $B-$, $LS-$, $LS+$, $7_1$, $14_1$, $28_1$, on, off, $7_2$, $14_2$ and $28_2$, these train line conductors being electrically connected to the stationary contact terminals of the master controller MC bearing corresponding reference characters.

The energizing circuits of the various electrically operated switches, valves and electromagnets for controlling the operation of locomotive unit 1 are connected to the proper train line conductors through suitable interlock switches by the manipulation of the master controller, in the manner set forth in my co-pending application. The control of the locomotive unit 2 is effected by a duplicate set of control connections (not shown) which are similarly connected to the train line conductors and which operate in substantially the same manner.

The point of distinction in connections between this system and that set forth in my co-pending application resides in the employment of additional stationary contact terminals $7'_2$, $14'_2$ and $28'_2$ and coöperating movable segment 113, together with additional train line conductors $7_2$, $14_2$ and $28_2$ which are adapted to supply energy for the actuation of certain of the electrically operated switches, valves and electro-magnets of the locomotive unit 2 in a similar manner to that supplied to the corresponding devices of locomotive unit 1.

The configuration of conducting segment 113 is such with respect to conducting segment 112 that, in the transition from one speed combination to another, the change-over of the circuit connections of motors $M^3$ and $M^4$ of locomotive unit 2 is effected prior to that of motors $M^1$ and $M^2$ of locomotive unit 1, whereby the driving motors of one of the units serve to act upon and carry the load during transitions.

The acceleration drum AD is adapted to control the operation of the several operating devices $OD^1$ and $OD^2$, whereby the several regulating valves 82 of the rheostats $LR^1$, $LR^2$, $LR^3$ and $LR^4$ are simultaneously raised or lowered in position to effect corresponding changes in the levels of the electrolyte within the several rheostats, whereby the acceleration of the several driving motors $M^1$, $M^2$, $M^3$ and $M^4$ is governed concurrently.

Without attempting a complete description, a brief exposition of the operation of the system will now be given, particular attention being given to the novel features of the system which provide for successive transitions in the motor connections between the several speed combinations.

Assuming the apparatus and connections to be as shown, the speed drum SD is first moved into its position 7, while the acceleration drum AD is moved to its "lower" position, whereby the several outlet valves $OV^2$, and $OV^4$ of the respective operating devices $OD^1$ and $OD^2$ are concurrently energized to effect the simultaneous closure of the corresponding discharge valves 81, provided that the several pole change-over switches and cascade switches occupy their proper positions for establishing the first set of motor connections, as shown in Fig. 5.

Subsequent to the closure of the discharge valves 81, the several sets of line switches $A^1$, $B^1$ and $C^1$ and $A^3$, $B^3$ and $C^3$ are closed to connect the motors M¹ and M³ to the supply circuits 5, 6 and 7. The acceleration drum AD may then be moved to its "raise" position in which the "off" and "on" magnet valves of the several operating devices OD¹ and OD² are energized to cause said devices to raise their associated regulating valves 82 in position for effecting the concurrent acceleration of all of the driving motors M¹, M², M³ and M⁴.

When the operating devices OD¹ and OD² have reached their upper limit of travel, the several sets of short circuit switches X², Y², and X⁴ Y⁴ are closed.

In order to increase the speed of motor operation, it is necessary to rearrange the motor connections and, in order to accomplish this end, the speed drum SD is moved to a position substantially midway between its positions 7 and 14, where it is held for a sufficient interval to permit the transition in motor-circuit connections of the locomotive unit 2 before being moved into position 14.

In the mid-position referred to, conducting segment 113 disengages contact terminal $7'_2$ and, hence, the train line conductors $7_2$ is deënergized, whereby the discharge valve 81 of rheostat LR⁴ is opened and the "off" and "on" magnet valves of the operating device OD² are deënergized to cause the regulating valve 82 of the rheostat LR⁴ to be lowered to effect the rapid discharge of electrolyte from rheostat LR⁴. As soon as the regulating valve 82 of the rheostat LR⁴ reaches its lowermost position, line switches A³, B³ and C³ will be opened, after which cascade switch CS² will be actuated into its "off" position by reason of the coöperative engagement of contact terminal $14'_2$ with conducting segment 113 which energizes train line conductor $14_2$ and the operating magnet of said switch. Subsequently, the outlet magnet valves OV³ and OV⁴ are energized to effect the closure of the discharge valves 81 of rheostats LR³ and LR⁴, after which the line switches A³, B³, C³ and A⁴, B⁴ and C⁴ are closed and the operating device OD² is again actuated to raise the level of the electrolyte within rheostats LR³ and LR⁴ in accordance with the manipulation of the accelerating drum AD.

As soon as the connections of the motors M³ and M⁴ of locomotive unit 2 have been rearranged for the second operating speed, the speed drum SD is moved into its position 14, whereby the transition and reconnection of motors M¹ and M² is effected and normal operation is resumed.

Similarly, in the transition of motor-circuit connections between positions 14 and 28 of the speed drum SD, the change-over of motor connections of the locomotive unit 2 and locomotive unit 1 are effected successively, in a manner similar to that already described.

Moreover, in moving from one of the higher operating speed positions to a lower one, a successive change-over of the motor connections is effected, although, in this case, the transitions of the motors associated with locomotive unit 1 is effected prior to that of locomotive unit 2 by reason of the relationship of parts of the conducting segments 112 and 113 of the speed drum.

No further description of the system is deemed necessary, it being believed that those skilled in the art will have no difficulty in understanding the novel features of my present invention without an amplified description of those portions of the system which are old and fully disclosed in my co-pending application.

In its broadest aspect, my invention is not restricted to any particular type of driving motors or class of control systems, and it is evident that the specific arrangement and location of parts and circuit connections shown, is, therefore, relatively unessential except as they illustrate a complete and operative system embodying my invention. Modifications therein may obviously be made within the spirit and scope of my invention and I have intended to cover such modifications in the appended claims.

I claim as my invention:

1. In a system of control, the combination with a source of energy, two similar sets of polyphase induction motors adapted to drive a common load and receiving energy from said source, and switching means for arranging the motors of each set for cascade and for parallel operation, whereby different ranges of operating speeds are obtained, of means for successively rearranging the connections of said sets of driving motors, whereby one set of motors is driving during the transition in connections of the other set.

2. In a system of control, the combination with a source of energy, two similar sets of polyphase induction motors adapted to drive a common load and receiving energy from said source, means for changing the motor connections for each set, whereby different ranges of operating speeds are obtained, and means for governing the acceleration of the motors for each speed arrangement, of means for causing the connections of one set of motors to be changed prior to those of the other set, whereby a continuous driving effort upon the load is maintained.

3. In a system of control, the combination with a source of energy, and two sets of polyphase induction motors adapted to drive a common load and receiving energy from said source, of means for connecting each set of said motors for cascade operation with one number of poles, for parallel operation with the same number of poles, and for parallel operation with a different number of poles, and means for successively effecting said changes in motor connections of said several sets of motors.

4. In a system of control, the combination with a source of energy, two sets of polyphase induction motors adapted to drive a common load and receiving energy from said source, and switching means for arranging the motor connections of each set of motors for several speeds of operation, of controllable electrically governed means for controlling the operation of said switching means and for causing the switching means of one set of motors to effect the transition in speed connections prior to that of the other set, whereby one set of motors is operating during the transitions.

5. In a system of control, the combination with a source of energy, a plurality of sets of polyphase induction motors receiving energy therefrom, and means for arranging the connections of each set of motors for several speeds of operation, of electrical means for controlling the operation of said means and comprising a master controller adapted to occupy a plurality of operating positions and to effect successive operations of said means for arranging the connections of the several sets of motors during the transition from one operating speed to another.

6. In a system of control, the combination with a source of energy, a plurality of sets of polyphase induction motors receiving energy therefrom, and means for arranging the connections of each set of motors for several speeds of operation, of electrical means for controlling the operation of said means and comprising a master controller adapted to occupy a plurality of operating positions and having a plurality of conducting segments for respectively governing the operation of the means for arranging the connections of said several sets of driving motors, said segments being arranged to effect the successive operation of said means during the transition from one speed to another.

7. In a system of control, the combination with a source of energy, a plurality of sets of polyphase induction motors receiving energy therefrom, and means for arranging the connections of each set of motors for several speeds of operation, of electrical means for controlling the operation of said means and comprising a master controller adapted to occupy a plurality of operating positions and having a plurality of conducting segments arranged to effect the alternate operation of the means for arranging the connections of said several sets of motors, said operation being effected between the various operating positions of said controllers.

8. In a system of control for an electric vehicle having a pair of driving units, the combination with a similar pair of polyphase induction motors for each unit, and means for changing the number of poles of said motors to obtain a plurality of ranges of operating speeds, of means for effecting successive change-overs of the motors of the respective units, whereby the motors of one unit are adapted to carry the load during the transitions from one speed connection to another.

9. In a system of control for an electric vehicle having a pair of driving units, the combination with a plurality of driving motors for each unit, separate means associated with each set of motors for changing the motor connections for different ranges of operating speeds, and separate means associated with each set of motors for governing the acceleration thereof for each range of speed, of remote-control means for effecting successive operations of both of said speed-changing means and for effecting concurrent operation of both of said acceleration governing means.

10. In a system of control for an electric vehicle having a pair of driving units, the combination with a plurality of driving motors for each unit, separate means associated with each set of motors for changing the motor connections for different ranges of operating speeds, and separate means associated with each set of motors for governing the acceleration thereof for each range of speed, of electrical remote-control means for governing the speed-changing means and the acceleration-governing means of each set of motors and embodying a controller for effecting concurrent operation of both of said acceleration-governing means, and a second controller for effecting successive operations of said speed-changing means during the transition of motor connections from one operating speed to another.

In testimony whereof, I have hereunto subscribed my name this 12th day of Sept., 1914.

ARTHUR J. HALL.

Witnesses:
H. T. MORRIS,
B. B. HINES.